US010151394B2

(12) United States Patent
Pittman

(10) Patent No.: US 10,151,394 B2
(45) Date of Patent: Dec. 11, 2018

(54) LEAK PATCHING SYSTEM

(71) Applicant: William Pittman, Henagar, AL (US)

(72) Inventor: William Pittman, Henagar, AL (US)

( * ) Notice: Subject to any disclaimer, the term of this patent is extended or adjusted under 35 U.S.C. 154(b) by 138 days.

(21) Appl. No.: 15/437,241

(22) Filed: Feb. 20, 2017

(65) Prior Publication Data

US 2018/0238451 A1 Aug. 23, 2018

(51) Int. Cl.
*F16J 15/10* (2006.01)
*B65D 25/20* (2006.01)

(52) U.S. Cl.
CPC .............. *F16J 15/10* (2013.01); *B65D 25/20* (2013.01)

(58) Field of Classification Search
CPC ....... F16J 15/10; B65D 25/20; F16L 55/1683; F16L 55/1612
USPC ......... 138/99, 98; 220/678; 277/650; 106/33
See application file for complete search history.

(56) References Cited

U.S. PATENT DOCUMENTS 2,727,650 A 12/1955 Moynihan et al.
3,078,183 A 2/1963 Karalus
3,251,461 A 5/1966 Smith
4,709,826 A 12/1987 Wong
5,297,582 A * 3/1994 Kitajima ................ F16L 55/10 138/97
D439,982 S 4/2001 Ruscitti
6,387,485 B1 5/2002 Bielek et al.
2009/0261093 A1* 10/2009 Fullerton ............... B25H 3/021 220/4.28
2009/0261531 A1* 10/2009 Deshpande .............. F16J 15/54 277/629

FOREIGN PATENT DOCUMENTS

WO WO2013074050 5/2013

* cited by examiner

*Primary Examiner* — Stephen Castellano

(57) ABSTRACT

A leak patching system includes a container that may contain a fluid. The container is perforated such that the container has a leak. A first magnet is selectively positioned to engage the container. The first magnet magnetically engages the container when the container is comprised of a ferromagnetic material and the first magnet is aligned with the leak. A sealant is applied to the first magnet. The sealant seals the leak when the first magnet is applied to the container. In this way the sealant inhibits the fluid from escaping through the leak. A second magnet is selectively positioned to engage the container when the container is comprised of a non-ferromagnetic material. The first magnet magnetically engages the second magnet to retain each of the first magnet and the second magnet on the container.

5 Claims, 3 Drawing Sheets

LEAK PATCHING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

1 Field of the Invention

The disclosure relates to patching devices and more particularly pertains to a new patching device for patching a leak in a container.

2 Description of Related Art Including Information Disclosed Under 37 CFR 1.97 and 1.98

Prior art will relate to patching devices and more particularly patching devices for patching a leak in a container.

BRIEF SUMMARY OF THE INVENTION

An embodiment of the disclosure meets the needs presented above by generally comprising a container that may contain a fluid. The container is perforated such that the container has a leak. A first magnet is selectively positioned to engage the container. The first magnet magnetically engages the container when the container is comprised of a ferromagnetic material and the first magnet is aligned with the leak. A sealant is applied to the first magnet. The sealant seals the leak when the first magnet is applied to the container. In this way the sealant inhibits the fluid from escaping through the leak. A second magnet is selectively positioned to engage the container when the container is comprised of a non-ferromagnetic material. The first magnet magnetically engages the second magnet to retain each of the first magnet and the second magnet on the container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
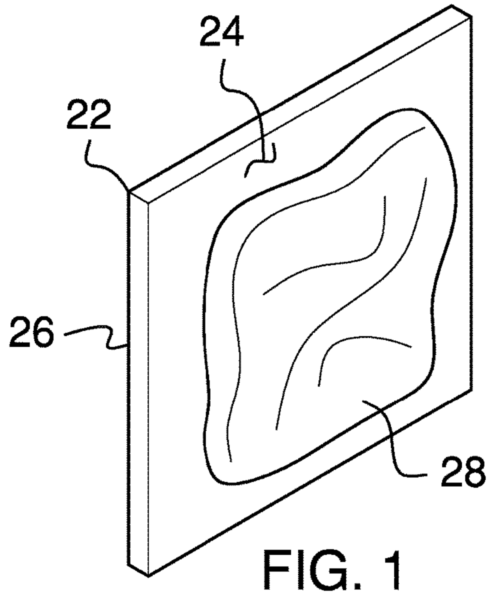
FIG. 1 is a perspective view of first magnet of a leak patching system according to an embodiment of the disclosure.
Figure 2:
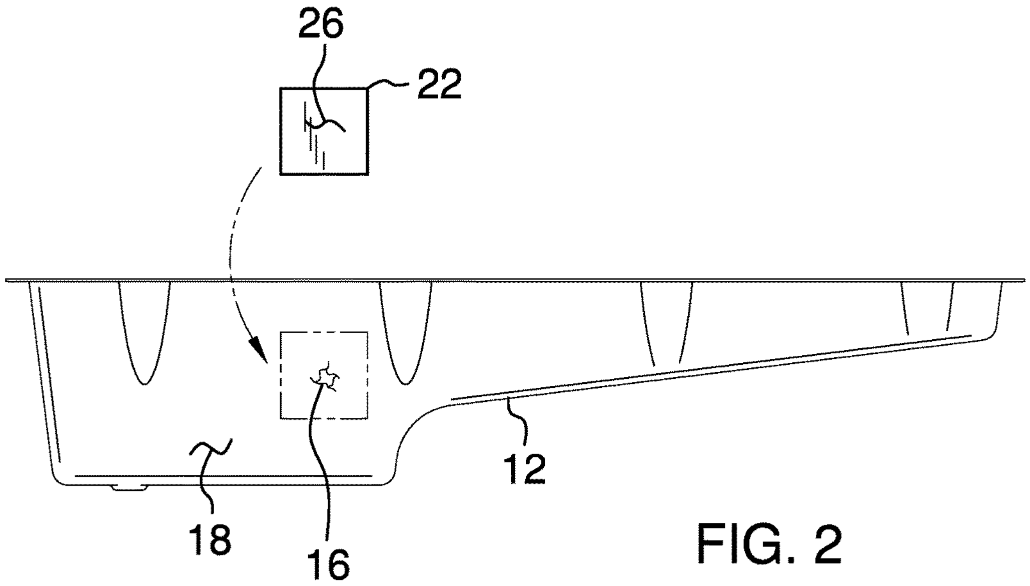
FIG. 2 is a left side view of an embodiment of the disclosure.
Figure 3:
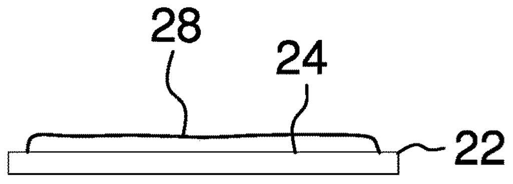
FIG. 3 is a bottom view of a first magnet of an embodiment of the disclosure.
Figure 4:
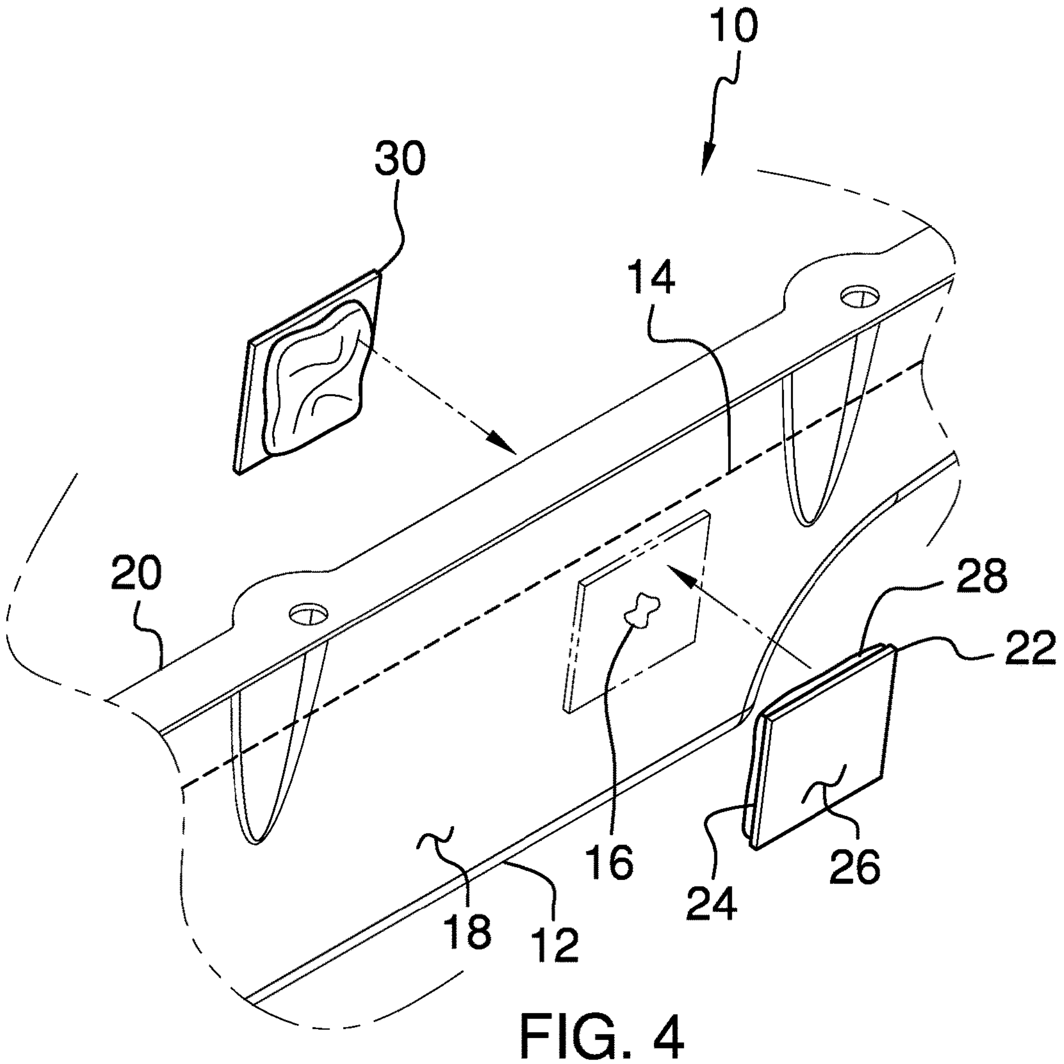
FIG. 4 is a perspective in-use view of an embodiment of the disclosure.

With reference now to the drawings, and in particular to FIGS. 1 through 5 thereof, a new patching device embodying the principles and concepts of an embodiment of the disclosure and generally designated by the reference numeral 10 will be described.

As best illustrated in FIGS. 1 through 5, the leak patching system 10 generally comprises a container 12 that may contain a fluid 14. The container 12 may be an oil pan on a motor or the like and the fluid 14 may be motor oil. The container 12 is perforated such that the container 12 has a leak 16 and the container 12 has an outside surface 18 and an inside surface 20. The perforation may have occurred due to corrosion, penetration by a foreign object or any other means of causing a container 12 to leak 16.

A first magnet 22 is provided and the first magnet 22 is selectively positioned to engage the container 12. Moreover, the first magnet 22 magnetically engages the container 12 when the container 12 is comprised of a ferromagnetic material. The first magnet 22 is aligned with the leak 16 when the first magnet 22 is positioned on the container 12. The first magnet 22 has a first surface 24 and a second surface 26 and the first surface 24 engages the outside surface 18 of the container 12 when the first magnet 22 is positioned on the container 12. The first magnet 22 may be a rare-earth magnet or be comprised of any other magnetic material.

A sealant 28 is applied to the first magnet 22 and the sealant 28 seals the leak 16 when the first magnet 22 is applied to the container 12. In this way the sealant 28 inhibits the fluid from escaping through the leak 16. The sealant 28 is positioned on the first surface 24 and the sealant 28 is comprised of a fluid impermeable material. Moreover, the sealant 28 may be a fluid sealant such as room temperature vulcanizing rubber, silicon or other fluid sealant.

A second magnet 30 is provided and the second magnet 30 is selectively positioned to engage the container 12 when the container 12 is comprised of a non-ferromagnetic material. The second magnet 30 has an opposite polarity with respect to a polarity of the first magnet 22. The second magnet 30 engages the inside surface 20 of the container 12 when the second magnet 30 is positioned on the container 12. Moreover, the second magnet 30 is aligned with the first magnet 22 such that the first magnet 22 magnetically engages the second magnet 30. In this way each of the first magnet 22 and the second magnet 30 are magnetically retained on the container 12 when the container 12 is comprised of the non-ferromagnetic material. The second magnet may be a rare-earth magnet or be comprised of any other magnetic material.

Figure 5:
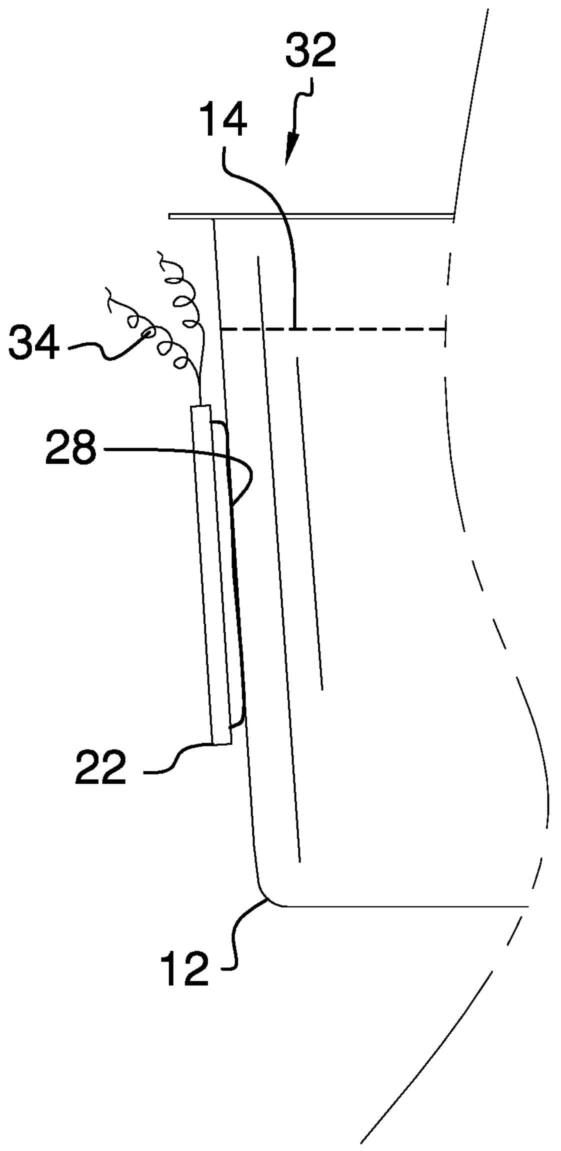
FIG. 5 is a perspective view of an alternative embodiment of the disclosure.

In an alternative embodiment 32 as shown in FIG. 5, the first magnet 22 may be an electromagnet and the first magnet 22 may be electrically coupled to a power source 34. The fluid 14 in the container 12 may be pressurized. The electromagnetic properties of the first magnet 22 facilitate the strength of the magnetic attraction between the container 12 and the first magnet 22 to be adjusted to resist the pressure of the fluid 14 in the container 12. In this way the leak 16 is sealed when the fluid 14 in the container 12 is pressurized.

In use, the first magnet 22 is positioned on the outside surface 18 of the container 12 when the container 12 has a leak 16. The first magnet 22 is manipulated to facilitate the sealant 28 to engage the outside surface 18 of the container 12 and the first magnet 22 is aligned with the leak 16. In this way the first magnet 22 magnetically engages the container 12 and the sealant 28 seals the leak 16. In this way the leak 16 in the container 12 is sealed without having to drain the fluid 14 from the container 12 or having to remove the container 12 from a supporting structure. Thus, the first magnet 22 facilitates a leak 16 in an oil pan of a motor to be sealed in a remote location without performing mechanical work to remove the oil pan from the motor. The second magnet 30 is positioned in the inside surface 20 of the container 12 when the container 12 is comprised of a non-ferromagnetic material. The second magnet 30 is aligned with the first magnet 22 to magnetically retain each of the first 22 and second 30 magnets on the container 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A leak patching system comprising:

a container being configured to contain a fluid, said container being perforated such that the container has a leak;

a first magnet being selectively positioned to engage the container thereby facilitating said first magnet to magnetically engage said container when said container is comprised of a ferromagnetic material, said first magnet being aligned with the leak;

a sealant being applied to said first magnet, said sealant sealing the leak when said first magnet is applied to said container wherein said sealant is configured to inhibit the fluid from escaping through the leak; and a second magnet being selectively positioned to engage the container when said container is comprised of a non-ferromagnetic material, said second magnet having an opposite polarity with respect to a polarity of said first magnet, said second magnet being aligned with said first magnet such that said first magnet magnetically engages said second magnet to retain each of said first magnet and said second magnet on said container.

2. The system according to claim 1, wherein:

said container has an outside surface; and said first magnet has a first surface and a second surface, said first surface engaging said outside surface of said container when said first magnet is positioned on said container.

3. The system according to claim 2, wherein said sealant is positioned on said first surface, said sealant being comprised of a fluid impermeable material.

4. The system according to claim 1, wherein:

said container has an inside surface; and said second magnet engages said inside surface of said container when said second magnet is positioned on said container.

5. A leak patching system comprising:

a container being configured to contain a fluid, said container being perforated such that the container has a leak, said container having an outside surface and an inside surface;

a first magnet being selectively positioned to engage the container thereby facilitating said first magnet to magnetically engage said container when said container is comprised of a ferromagnetic material, said first magnet being aligned with the leak, said first magnet having a first surface and a second surface, said first surface engaging said outside surface of said container when said first magnet is positioned on said container;

a sealant being applied to said first magnet, said sealant sealing the leak when said first magnet is applied to said container wherein said sealant is configured to inhibit the fluid from escaping through the leak, said sealant being positioned on said first surface, said sealant being comprised of a fluid impermeable material; and a second magnet being selectively positioned to engage the container when said container is comprised of a non-ferromagnetic material, said second magnet having an opposite polarity with respect to a polarity of said first magnet, said second magnet engaging said inside surface of said container when said second magnet is positioned on said container, said second magnet being aligned with said first magnet such that said first magnet magnetically engages said second magnet to retain each of said first magnet and said second magnet on said container.

* * * * *